Figure 1:
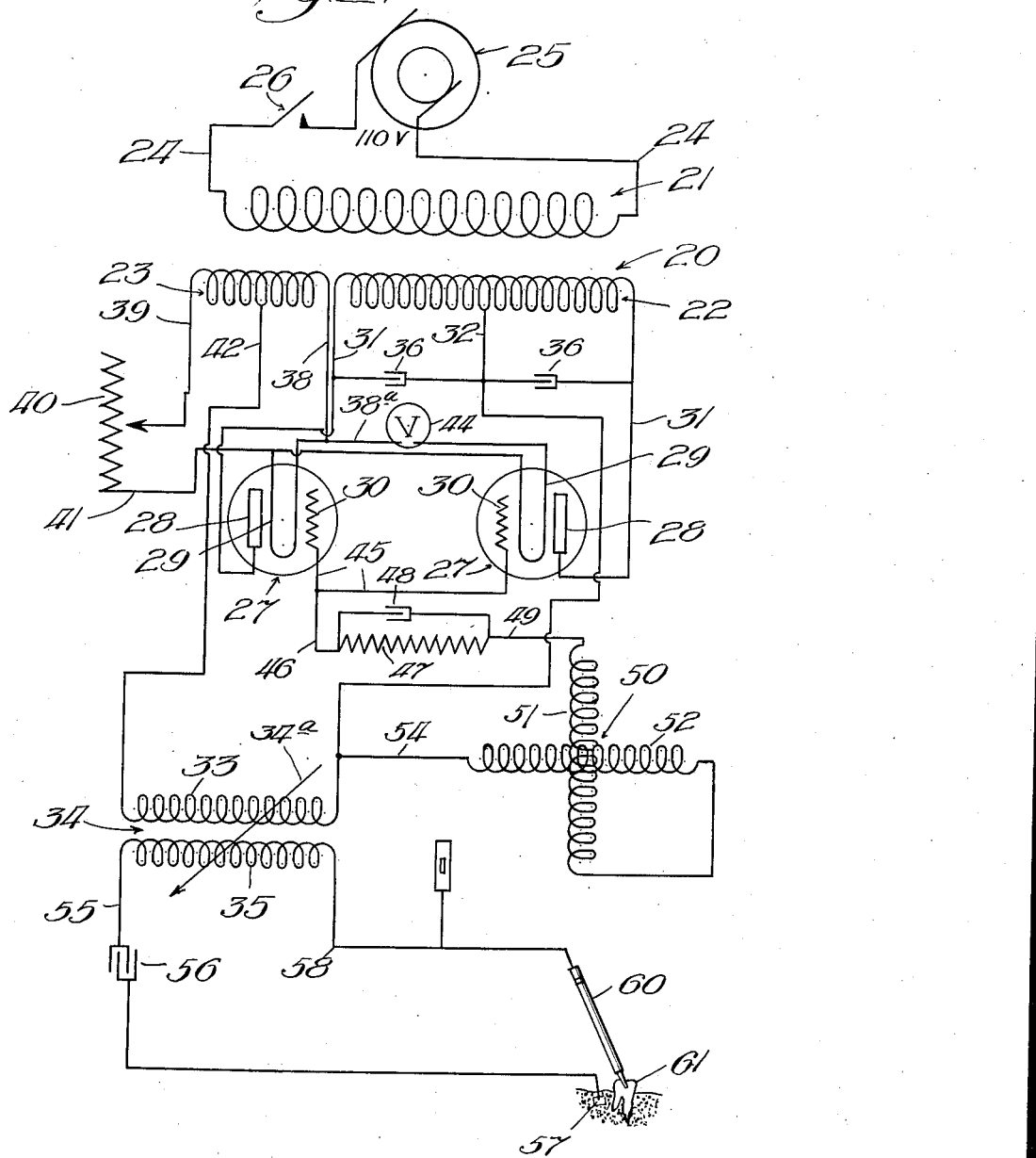

May 21, 1929.  N. H. LOWRY ET AL  1,713,971
METHOD OF AND APPARATUS FOR DENTAL STERILIZATION
Filed June 17, 1925    3 Sheets-Sheet 2

Inventors:
Nelson H. Lowry
Lloyd F. Megaw
by Rector, Hibben, Davis,
and Macauley, Attys May 21, 1929. N. H. LOWRY ET AL 1,713,971
METHOD OF AND APPARATUS FOR DENTAL STERILIZATION
Filed June 17, 1925 3 Sheets-Sheet 3
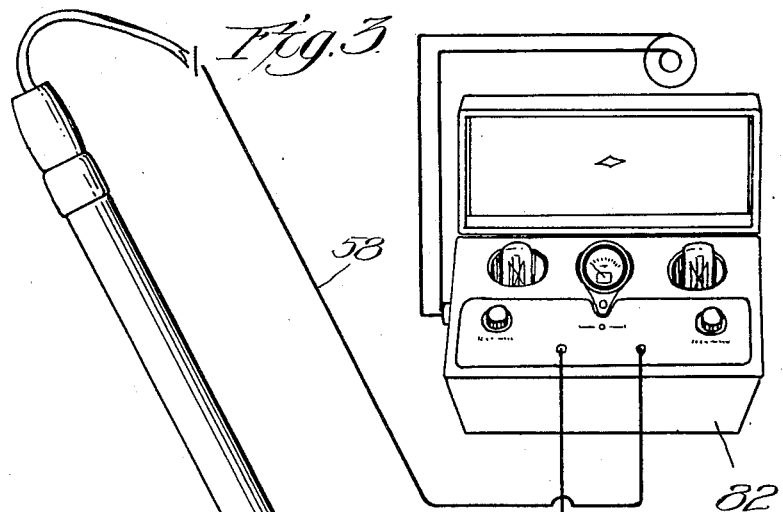
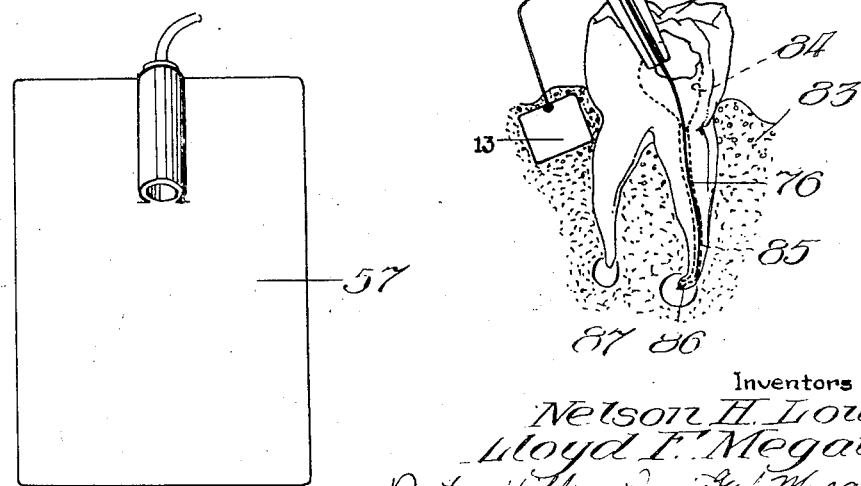
Inventors
Nelson H. Lowry
Lloyd F. Megaw Patented May 21, 1929.

1,713,971

UNITED STATES PATENT OFFICE.

NELSON H. LOWRY AND LLOYD F. MEGAW, OF CHICAGO, ILLINOIS.

METHOD OF AND APPARATUS FOR DENTAL STERILIZATION.

Application filed June 17, 1925. Serial No. 37,623.

This invention relates to a new and useful method of sterilizing root canals, apical foramina, apical spaces and various other cavities or tissues which may be involved in dental pathology under various conditions of decay or infection such as caries, alveolar abcesses, pyorrhea and the like, the purpose of the present invention being to provide means for effecting a thorough sterilization in connection with the preparation of the teeth for and preliminary to dental filling or restoration.

Among the objects of the invention are to provide a method of and means for drying the inner walls of the decayed tooth, to provide means for complete desiccation and sealing of the dental fibrillæ to a depth considerably beyond the actual surface of contact, to provide means for sterilization of the apical foramina by desiccation and cauterization and to provide means for sterilizing the apical spaces. A further object of the invention is to provide a method of and means for effecting the foregoing results by the operation of high frequency radio-surgical apparatus, similar in some respects to that disclosed in the co-pending application of Nelson H. Lowry, Serial No. 732,532, filed August 16, 1924.

In the preparation of teeth for filling and the like it is necessary, in order that a foundation may be made upon which a dental restoration will give satisfactory service and protection, that all carious matter be removed from the tooth cavity, that all soft tissue be removed from the pulp chamber when the pulp is involved as well as from the root canals and apical foramina, that the walls of the pulp chamber and root canal be thoroughly dried, sterilized and sealed, and that the instrument used in the process of sterilization be not permitted to extend too far beyond the apical foramina. The removal of any soft tissue is important because if allowed to remain in a de-vitalized tooth without sterilization, it becomes infected and the products of decomposition become a source of trouble causing caries, under-mined and loosened fillings, alveolar abcesses and the like. It is important to prevent injury to the peridontal membrane through chemical or mechanical irritation since that may be followed by inflammation and pyorrhea. The irregularities in root canals, the existence of duplex or delta foramina, the obscurity of the field of operation, and the lack of a visible test for the thoroughness of the operator's workmanship, have heretofore served to make root canal work the most uncertain operation in modern dentistry, and no satisfactory or certain method of sterilization has heretofore been known. The present invention overcomes the above mentioned difficulties and satisfies the stated requirements by providing an improved method and apparatus which may be employed in dental sterilization with practical certainty of result and with assurance that no further trouble will be developed after the treatment of the tooth has been completed.

The nature of the invention will be more fully understood from the following specification taken with the accompanying drawings in which one form of apparatus for carrying out the improved method of the present invention is illustrated.

Figure 2:
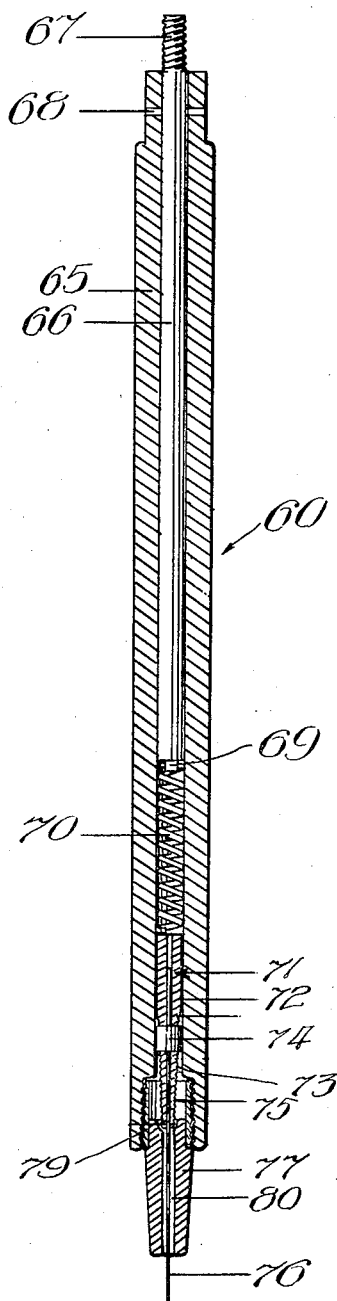

In the drawings, Figure 1 is a diagrammatic view showing the circuit connections of the apparatus of the present invention for producing the high frequency oscillations which are utilized to effect the dental sterilization; Fig 2 shows a longitudinal section through the movable electrode or terminal of the apparatus illustrated in Fig. 1; Fig. 3 shows a somewhat diagrammatic view of the application of the apparatus to dental work, the cabinet containing the surgical apparatus being shown in perspective, and the terminals of the apparatus being illustrated in position for the treatment of a tooth; and Fig. 4 shows the stationary terminal or contact plate of the apparatus.

In the apparatus of the present invention the sterilization of the parts and the dehydration of the surface is effected by a high frequency electrical discharge such as that which is employed in radio sound transmission. The body of the patient forms one terminal or electrode of a secondary circuit and the other terminal or electrode of this circuit serves as the operating instrument which is manipulated by the dentist or surgeon during the process of performing the operation of sterilizing the teeth. This secondary circuit in which these terminals or electrodes are connected is inductively related through an adjustable high frequency oscillation transformer with the circuit in which the high frequency oscillations are produced and the frequency of the oscillations may be three million per second for example, or even higher. The general circuit connections of the apparatus of the present invention are illustrated in Fig. 1. These circuit connections are in some respects similar to the connections which are employed in one form of apparatus for radio sound transmission of the continuous wave type but differ therefrom in certain important features. As shown in the drawings, the apparatus comprises a low frequency transformer 20 having a primary winding 21, a high voltage secondary winding 22 and a low voltage secondary winding 23. The terminals of the primary winding 21 are connected by conductors 24 to a suitable source of supply 25 which may preferably be a 110 volt, 60 cycle, alternating current system. A switch 26 is connected in the primary circuit for controlling the operation of the apparatus. The apparatus comprises two vacuum tubes 27, each comprising a plate 28, a filament 29, and a grid 30, these parts being similar in construction to those commonly employed in radio sound transmission. The high voltage transformer winding 22 has its terminals connected by conductors 31 to the plates 28 of the vacuum tubes, and the middle point of the secondary winding 22 is connected by a conductor 32 to one terminal of the primary winding 33 of a high frequency transformer 34, of the variable type as indicated by the inclined arrow 34ª, which has a secondary winding 35. In order to maintain an exact electrical balance between the divisions of the secondary winding 22 of the transformer 20, condensers 36 are connected between the conductors 31 and the conductor 32 which leads from the middle point of the winding 22, thereby effecting the impression of equal voltages upon the two plates 28 of the vacuum tubes. The low voltage winding 23 of the transformer 20 is connected to the filament 29 of the vacuum tubes which are arranged in parallel electric circuits. A conductor 38 leads from one terminal of the winding 23 and is connected to branch conductors 38ª which lead to one terminal of each of the filaments 29. A conductor 39 leads from the other terminal of the winding 23 to a rheostat 40 and a conductor 41 leads from the other terminal of the rheostat to the other terminals of each of the filaments 29, so that by varying the adjustment of the rheostat 40 the voltage which is impressed on each of the filaments may be regulated as desired. This voltage is indicated by a volt-meter 44. The middle point of the secondary winding 23 of the transformer 20 has a conductor 42 leading therefrom to the terminal of the primary winding 33 of the high frequency transformer 34 opposite that to which the conductor 32 is connected, it being apparent therefore that the terminals of the primary winding 33 are connected to the middle points of each of the secondary windings of the transformer 20. The grids 30 of the vacuum tubes 27 are connected by conductors 45 to a common conductor 46 which leads through a non-inductive resistance 47 having a condenser 48 connected in parallel therewith to another conductor 49 which is connected to one terminal of a variometer 50 comprising two inductive windings 51 and 52 which are connected in series and which are capable of relative angular movement in order to vary their inductive effect. The other terminal of the variometer is connected by a conductor 54 to the conductor 32, previously referred to, which leads to one terminal of the transformer winding 33.

The switch 26 in the supply circuit of the transformer 20 controls the operation of the apparatus, and having closed this switch and impressed a suitable voltage on the primary winding 21 of the transformer 20, secondary voltages are induced in the windings 22 and 23 and are impressed thereby on the plates 28 and filaments 29 of the vacuum tubes. The voltage on the filaments is indicated by the volt meter 44 and is regulated by the rheostat 40 until it reaches the value for which the apparatus is designed, preferably about 10 volts. The voltage which is impressed upon the grids 30 of the vacuum tubes and the inductance of the grid circuit are varied by the regulation of the variometer 50 until the whole circuit is brought into oscillation by reason of the oscillatory discharges which take place between the plates 28 and the filaments 29 through the grids 30 which, in the actual construction of the apparatus, are located between them. These undamped high frequency oscillations are transmitted through the variometer to the primary winding 33 of the oscillation or high frequency transformer 34 with the result that high frequency oscillations are induced in the secondary winding 35 of this transformer. The wave length of the oscillations generated by the apparatus may preferably be approximately eighty (80) meters or less with a corresponding frequency of about 3,750 kilo cycles per second.

One terminal of the secondary winding 35 of the oscillation transformer is connected by a conductor 55, leading through a series condenser 56, to a plate 57 constituting an indifferent electrode adapted to contact with the body of the patient constituting the subject to be treated. A conductor 58 leads from the other terminal of the secondary winding 35 to the movable operating electrode 60 which, upon being brought in proximity to the tooth of the patient, represented at 61, completes the secondary circuit of the transformer 34, the high frequency discharge between the terminal of the operating electrode 60 and the tooth of the patient operating to dehydrate and sterilize the tooth or tissue at and adjacent to the point of discharge.

In order that the electrical discharge may be caused to take place at various points in the cavities and recesses of a tooth, a special form of movable operating electrode 60 is required. The preferred form of this electrode is illustrated particularly in Fig. 2 where it is shown as comprising an insulating sleeve 65 of bakelite or other suitable material having mounted therein a conductor 66 provided with a threaded end 67 adapted to be connected to the conductor 58 illustrated in Figs. 1 and 3. The conducting rod 66 is secured in place in the insulating sleeve or handle 65 by means of a transverse pin 68 and the lower end of the rod 66 is provided with an extension 69 adapted to engage the upper end of a coil spring 70 mounted in the bore of the sleeve or handle 65. The lower end of the spring 70 engages the upper end of a broach holder 71 of the well-known construction employed in dental work, consisting of a body portion 72 the lower end of which is tapered as shown at 73 and externally threaded for engagement by a nut 74. The body portion of the broach holder is slotted longitudinally as shown at 75 so that when the nut 74 is tightened the split end of the body portion of the broach holder is caused to grip the applicator 76 which is constructed in the form of a fine-pointed flexible needle made preferably of iridio-platinum wire of about 28 gauge, the alloy of the wire containing preferably about 30 per cent of iridium. An insulating tip 77 is mounted in the lower end of the handle 65 and extends upwardly around the lower tapered end of the broach holder 71. The insulating tip 77 is formed preferably of porcelain or the like and is secured in a metal sleeve 78 which threadedly engages the internally threaded enlarged bore 79 located at the lower end of the handle 65. The tip 77 is provided with a small bore 80 through which the applicator 76 extends and the upper end of this bore is countersunk to be engaged by the lower extremity of the broach holder 71. The applicator 76 extends some distance below the insulating tip 80 and it is this projecting portion of the applicator which is employed in effecting the sterilization of the tooth. The length of that portion of the applicator 76 which projects beyond the insulating tip 77 may be varied readily by adjusting the position of the applicator in the broach holder 71, which is a feature of importance in determining the extent to which the applicator may be projected into the root canal of a tooth. Since all of the external parts of the movable electrode are insulated excepting the projecting portion of the applicator 76, it will be apparent that the electrode may be conveniently manipulated by the dentist without electrical loss or shock.

The method of using the apparatus described above for dental sterilization may be best understood by reference to Fig. 3 which shows somewhat diagrammatically the application of the apparatus to a tooth. The principal parts of the apparatus are here shown as being contained in a cabinet 82 which may be provided with suitable instruments and controlling devices for revealing the adjustment of the apparatus to the operator. The tooth 61, referred to in connection with Figure 1 of the drawings, is here illustrated in position in the gum 83 of the patient, the gum being technically known as the alveolar process. The tooth is shown as one in which the decaying process has proceeded to the third stage of carious development in which the pulp is involved. The pulp chamber 84 is first cleaned in the usual manner and the canal 85 is entered with broaches and reamers until the apical foramen 86 of the canal is reached. After the cavity and canal of the tooth have thus been treated in the usual manner by the ordinary dental instruments, a test wire or test wires are put in place in the root canal extending to the bottom thereof and into the apical space 87, after which a radiograph or X-ray picture should be taken to determine whether the test wire or wires are properly in place and projecting to the desired extent into the root canal or canals. By means of the test wire or wires inserted in this way, the length of the projecting portion of the applicator 76, to be used later, is determined, so that the applicator may be caused to extend into the root canal and into the apical space to the same extent that the test wire previously extended.

The terminal or electrode 57 is then connected to the patient in any suitable way, the connection being illustrated in Fig. 3 for convenience as being made directly to the gum although it would usually be made to the hand of the patient. The electrical apparatus being then energized and adjusted to produce the desired high frequency oscillations, the point of the applicator 76 is inserted in the cavity of the tooth, the length of the projecting portions of the applicator which extends beyond the insulating tip 77 having previously been determined by the test wire or wires, as above explained. When the point of the applicator 76 is brought in proximity to the surface of the cavity in the tooth, a high frequency discharge is set up between the point of the applicator and the wall of the tooth so that the moist tissue at the point of discharge is desiccated and destroyed. As soon as the moist tissue is desiccated and sterilized at one point so that the surface of the cavity is there entirely dry, the dry surface of the cavity loses its conducting properties and the discharge ceases. The dentist then moves the tip of the applicator 76 to a new spot and thus repeats the process of dehydration and sterilization over the surface of the tooth cavity until the entire surface has been covered. The progressive application of the tip of the applicator 76 to successive areas of the wall of the tooth cavity is made possible by reason of the fact that the dry dentine and cementum are insulating dielectrics so that the point of the applicator 76 can be moved further into the cavity or canals of the tooth without interfering with the electrical discharge at the extreme tip of the applicator on account of possible contact of other parts of the applicator with those surfaces of the tooth cavity which have previously been sterilized and thereby rendered incapable of conducting the electrical current. In this way, the applicator is moved about to dehydrate and sterilize the cavity of the tooth and it may then be caused to follow the root canal 85 until the remains of all pulp, fibres, ar infected and carious tissue which have filled the canal are completely desiccated. The insulating tip 77 may be extended partially into the cavity of the tooth and the engagement of this tip with the wall of the cavity limits the extent to which the applicator may be projected into the root canal, so that the applicator may be caused to extend through the apical foramen but is prevented from extending into the aveolar process beyond the apical space. In this way possible injury to the foraminal tissues is prevented. After this process of sterilization has been completed by the progressive application of the tip of the applicator to successive portions of the area of the cavity and canal of the tooth, the waste matter may be removed by means of broaches in the usual manner. The canal or canals of the tooth which have thus been treated are then moistened with a saline solution and the applicator again brought into use to effect a further location and desiccation of any remaining tissue. The sterilization and dehydration of any particular area of the surface of the cavity or canal is indicated by cessation of the sparking or discharge from the tip of the applicator to the tooth so that there is a visible indication of the progressive sterilizing operation which guides the dentist or surgeon in moving the applicator about until the entire process of sterilization has been completed.

If duplex or delta foramina, supernumerary canals, and the like, exist, their presence will be made apparent to the dentist by the sparking which occurs as the applicator is brought in contact with them and the alternate operations of cleansing and applying the applicator may be continued until by the absence of sparking it is known that the entire surface of the tooth cavity and all of the canals and their branches have been thoroughly desiccated and sterilized. The root canals and cavities of the tooth are then ready for filling in the usual manner.

The high frequency discharge which is produced at the point of the applicator may have an extremely high temperature, about 3000 degrees Fahrenheit, for example, but this discharge is concentrated upon a minute area for an extremely small period of time, for example, one-three-millionth (1/3,000,000) of a second when the instrument is tuned to a wave length of 100 meters, so that the actual caloric value is very small and the heating effect beyond the actual point of contact is so slight that there are no injurious pathological effects upon the surrounding tissue while at the same time the discharge acts as a cautery in desiccating, sealing and sterilizing the surface with which it comes in contact.

While a certain form of apparatus has been illustrated and described as a means of carrying on the improved process of the present invention, it will be understood that both the method and the apparatus may be varied widely within the scope of the appended claims.

We claim:

1. The method of sterilizing and drying a tooth which consists in subjecting the wall of a cavity in the tooth to the action of a discharge from a source of high frequency electrical oscillation until the said discharge will no longer take place.

2. The method of sterilizing a tooth which consists in subjecting the wall of a cavity of the tooth to the action of an electrical discharge from an electrode to the tooth by locating said electrode opposite one point on said wall and maintaining it in that position until said discharge ceases, and then moving said electrode to other points over said wall and thereby progressively sterilizing the surface of said wall.

3. The method of preparing a natural tooth which consists in destroying the soft tissue therein by subjecting it to the action of a discharge from a source of electrical oscillation, and then drying the walls of the cavity thus formed by subjecting said walls to the action of said electrical discharge.

4. The method of indicating the position of soft tissue in a natural tooth which consists in bringing a terminal of a source of electrical energy in close proximity to the tooth and observing the path of discharge.

5. The method of indicating the position of soft tissue and root canals in a natural tooth which consists in bringing a terminal of a source of high frequency electrical oscillations in close proximity to the interior surfaces of the tooth and observing the path of discharge.

6. The method of preparing a tooth which consists in indicating the position of soft tissue in the tooth by locating a terminal of a source of electrical oscillations in close proximity to the interior surface of the tooth, observing the path of discharge, and then destroying the soft tissue by subjecting it to the action of said discharge.

7. The method of preparing a tooth which consists in indicating the position of soft tissue in the tooth by locating a terminal of a source of electrical oscillations in close proximity to the interior surface of the tooth, observing the path of discharge, then destroying the soft tissue by subjecting it to the action of said discharge, and then removing the débris.

8. The method of preparing a tooth which consists in indicating the position of soft tissue in the tooth by locating a terminal of a source of electrical oscillations in close proximity to the interior surface of the tooth, observing the path of discharge, then destroying the soft tissue by subjecting it to the action of said discharge, then removing the débris, and then further drying and sterilizing the interior surfaces of the tooth by again subjecting them to the action of said electrical discharge.

9. The method of treating a tooth which consists in removing the decayed matter from the cavity of the tooth, inserting an instrument to determine the depth of said cavity, and then progressively inserting into said cavity an electrode connected to one terminal of a source of electrical oscillation, the other terminal of said source being connected to the body of the patient, said instrument being withdrawn before inserting said electrode, whereby the extent to which said electrode may be inserted is determined by the length of said instrument.

10. In dental apparatus, an electrical circuit having means for producing high frequency oscillation therein, a handle connected to one terminal of said circuit, an applicator connected to said terminal and projecting from said handle, means for varying the length of the projecting portion of said applicator, and means for connecting the other terminal of said circuit to the subject.

11. In dental apparatus, an insulating handle, a conductor mounted in said handle, an applicator connected to said conductor and projecting from said handle, an insulating sleeve connected to said handle and surrounding a part of said applicator, and means for varying the length of the portion of said applicator projecting from said insulating sleeve.

12. In dental apparatus, an insulating handle, a conductor mounted in said handle, an applicator, a broach holder connected to said conductor and having means for detachably engaging said applicator, and insulating means surrounding a portion of said applicator and said broach holder.

13. In dental apparatus, an insulating handle, a conductor mounted in said handle, an applicator adapted to project from said handle, a supporting conducting member for detachably connecting said applicator with said conductor, and a removable insulating sleeve connected to said handle and surrounding a portion of the projecting portion of said applicator.

NELSON H. LOWRY.
LLOYD F. MEGAW.